US012611893B2

(12) United States Patent
Rimai et al.

(10) Patent No.: US 12,611,893 B2
(45) Date of Patent: Apr. 28, 2026

(54) TIRE TREAD WITH A BAND LAYER

(71) Applicant: Bridgestone Americas Tire Operations, LLC, Nashville, TN (US)

(72) Inventors: Benjamin E. Rimai, Copley, OH (US); Bradley S. Plotner, Canton, OH (US); Jared J. Griebel, Orange Village, OH (US); Brandon P. Nelson, Stow, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 540 days.

(21) Appl. No.: 18/017,186

(22) PCT Filed: Jul. 28, 2021

(86) PCT No.: PCT/US2021/043364
§ 371 (c)(1),
(2) Date: Jan. 20, 2023

(87) PCT Pub. No.: WO2022/039892
PCT Pub. Date: Feb. 24, 2022

(65) Prior Publication Data
US 2023/0339265 A1     Oct. 26, 2023

Related U.S. Application Data

(60) Provisional application No. 63/066,963, filed on Aug. 18, 2020.

(51) Int. Cl.
B60C 7/22          (2006.01)
B60C 7/14          (2006.01)

(52) U.S. Cl.
CPC ................ B60C 7/22 (2013.01); B60C 7/146 (2021.08)

(58) Field of Classification Search
CPC .. B60C 7/10; B60C 7/102; B60C 7/22; B60C 7/14; B60C 7/146; B60C 7/107; B60C 9/18; B60C 11/00
See application file for complete search history.

(56) References Cited

U.S. PATENT DOCUMENTS 6,112,791 A      9/2000  Spragg et al.
9,962,994 B2 *  5/2018  Iwamura ................... B60C 7/18
(Continued)

FOREIGN PATENT DOCUMENTS

CN          107662456 A  *  2/2018  ............... B60C 7/14
GB              339403 A  *  12/1930  ............... B60C 7/14
(Continued)

OTHER PUBLICATIONS

Search Report; Corresponding EP Application Serial No. 21858790. 5; Examiner Wolfgang Jung; Dated Sep. 12, 2024.
(Continued)

*Primary Examiner* — Kip T Kotter
(74) *Attorney, Agent, or Firm* — Shaun J. Fox; Bryan J. Jaketic

(57) ABSTRACT

A non-pneumatic tire includes an inner ring having an axis of rotation and an outer ring coaxial with the inner ring. The non-pneumatic tire further includes support structure extending from the inner ring to the outer ring and a circumferential tread extending about the outer ring. The circumferential tread includes a band layer constructed of a single material and a tread rubber layer directly attached to the band layer. The band layer has a first face and a second face opposite the first face, and a first axial edge and a second axial edge, the first and second axial edges spacing the first face from the second face. At least one of the first edge and the second edge has a geometry that provides the band layer with a nonrectangular cross section.

2 Claims, 7 Drawing Sheets

(56) References Cited

U.S. PATENT DOCUMENTS

| 2004/0159385 A1* | 8/2004 | Rhyne .......................... B60C 7/00 |
| | | 152/197 |
| 2007/0267116 A1 | 11/2007 | Rhyne et al. |
| 2011/0011506 A1 | 1/2011 | Manesh et al. |
| 2012/0193004 A1 | 8/2012 | Anderson et al. |
| 2017/0057294 A1 | 3/2017 | Iwamura et al. |
| 2017/0297372 A1 | 10/2017 | Talbot et al. |
| 2018/0029419 A1 | 2/2018 | Kim et al. |
| 2020/0009916 A1 | 1/2020 | Thompson et al. |

FOREIGN PATENT DOCUMENTS

| KR | 10-2006-0121509 | 11/2006 |
| WO | 2020142665 A1 | 7/2020 |

OTHER PUBLICATIONS

International Preliminary Report on Patentability; Corresponding PCT Application No. PCT/US2021/043364; Nov. 17, 2021.
International Search Report and Written Opinion; Corresponding PCT Application No. PCT/US2021/043364; Nov. 17, 2021.

* cited by examiner

TIRE TREAD WITH A BAND LAYER

FIELD OF INVENTION

The present disclosure relates to a tire tread, and a method of making the same. More particularly, the present disclosure relates to a tire tread with a band layer attached to a tread rubber layer, and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring. In some non-pneumatic tires, a circumferential tread may be wrapped about the outer ring of the tire.

The circumferential tread may contain a shear element having an elastic region disposed between upper and lower inelastic regions. The shear element may also be referred to as a shear band, a tread band, or a thin annular high strength band element. When used in a pneumatic tire, the shear element acts as a tension member when the tire is pressurized. When used in a non-pneumatic tire, or a pneumatic tire in an unpressurized or partially pressurized state, the shear element acts as a structural compression member.

SUMMARY OF THE INVENTION

In one embodiment, a non-pneumatic tire includes an inner ring having an axis of rotation and an outer ring coaxial with the inner ring. The non-pneumatic tire further includes support structure extending from the inner ring to the outer ring and a circumferential tread extending about the outer ring. The circumferential tread includes a band layer constructed of a single material and a tread rubber layer directly attached to the band layer. The band layer includes a first face and a second face opposite the first face, and a first axial edge and a second axial edge, the first and second axial edges spacing the first face from the second face, where at least one of the first edge and the second edge has a geometry that provides the band layer with a nonrectangular cross section.

A method of making a non-pneumatic tire is also provided. The method includes providing an assembly with an inner ring, an outer ring coaxial with the inner ring, and support structure extending from the inner ring to the outer ring. A seamless cylinder is provided about the outer ring, the seamless cylinder being constructed of a single material. The seamless cylinder includes a first face and a second face opposite the first face, and a first axial edge and a second axial edge, the first and second axial edges spacing the first face from the second face, where at least one of the first edge and the second edge has a geometry that provides the seamless cylinder with a nonrectangular cross section. A tread rubber is provided about the seamless cylinder.

BRIEF DESCRIPTION OF DRAWINGS

In the accompanying drawings, structures are illustrated that, together with the detailed description provided below, describe exemplary embodiments of the claimed invention.

Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 4a is a cross-sectional view of one embodiment of a reverse flow forming system for forming a cylinder;

FIG. 4b is a front view of the reverse flow forming system of FIG. 4a;

DETAILED DESCRIPTION

Figure 1:
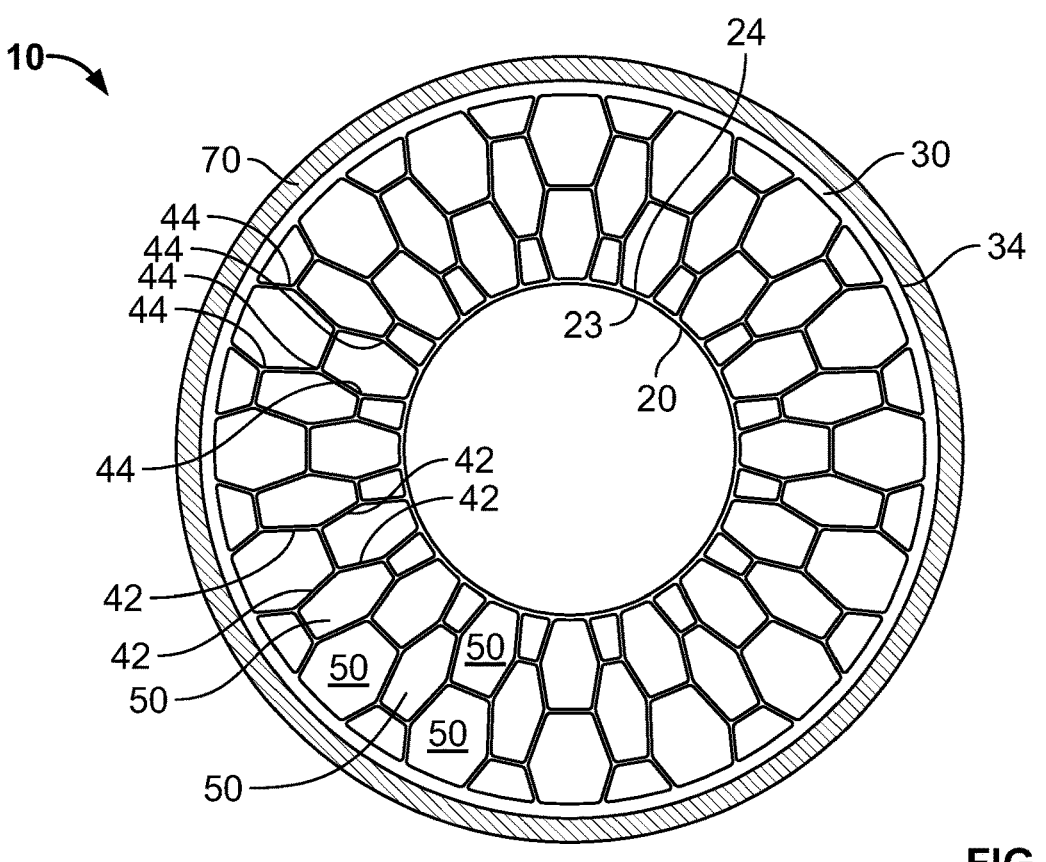
FIG. 1 is a side view of an undeformed non-pneumatic tire.
Figure 2:
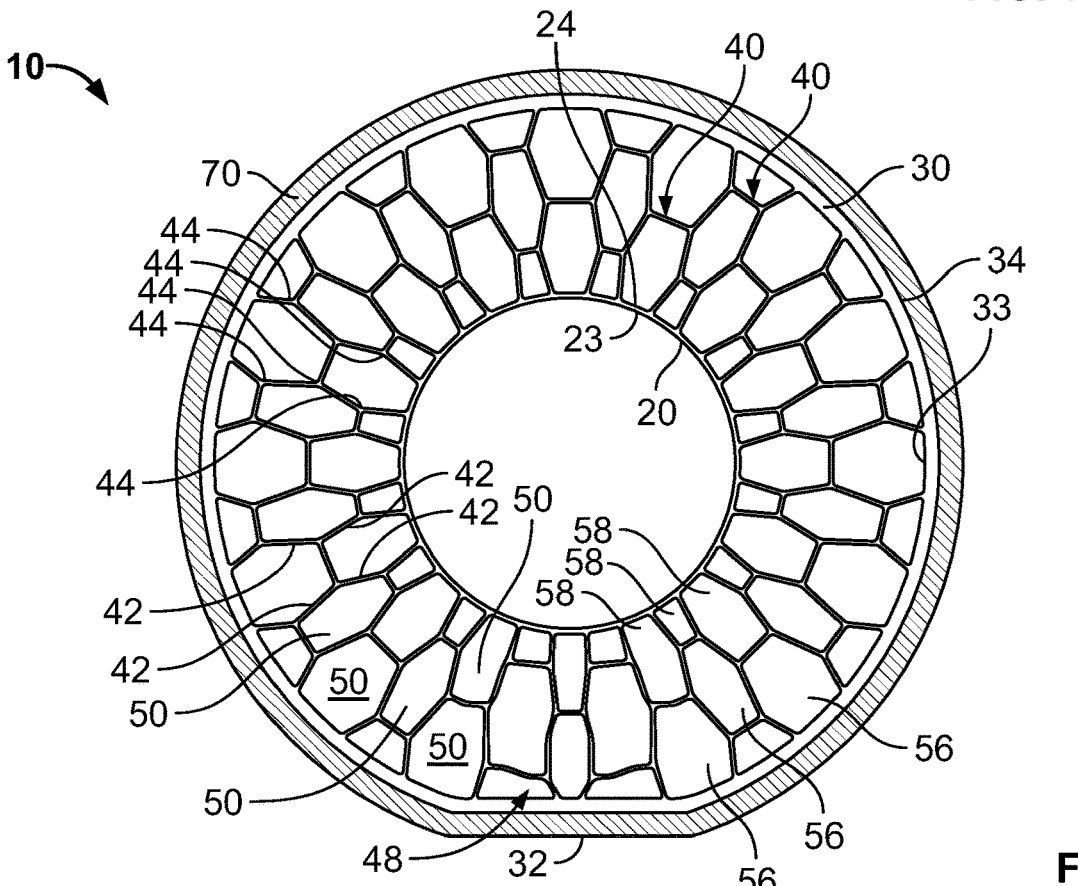
FIG. 2 is a side view of the non-pneumatic tire of FIG. 1 being deformed when subjected to a load.

FIGS. 1 and 2 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of an elastomeric material or metal.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. In an alternative embodiment, at least one of the generally annular inner ring, the generally annular outer ring, and the interconnected web are made of a different material. As shown in FIG. 1, the generally annular outer ring 30 can have a radially internal surface 33 and a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 with a plurality of vertices 44 that define a plurality of generally polygonal openings 50. In other embodiments (not shown), other web configurations may be employed. In another embodiment (not shown), spokes or other support structure may be employed instead of a web.

Figure 3A:
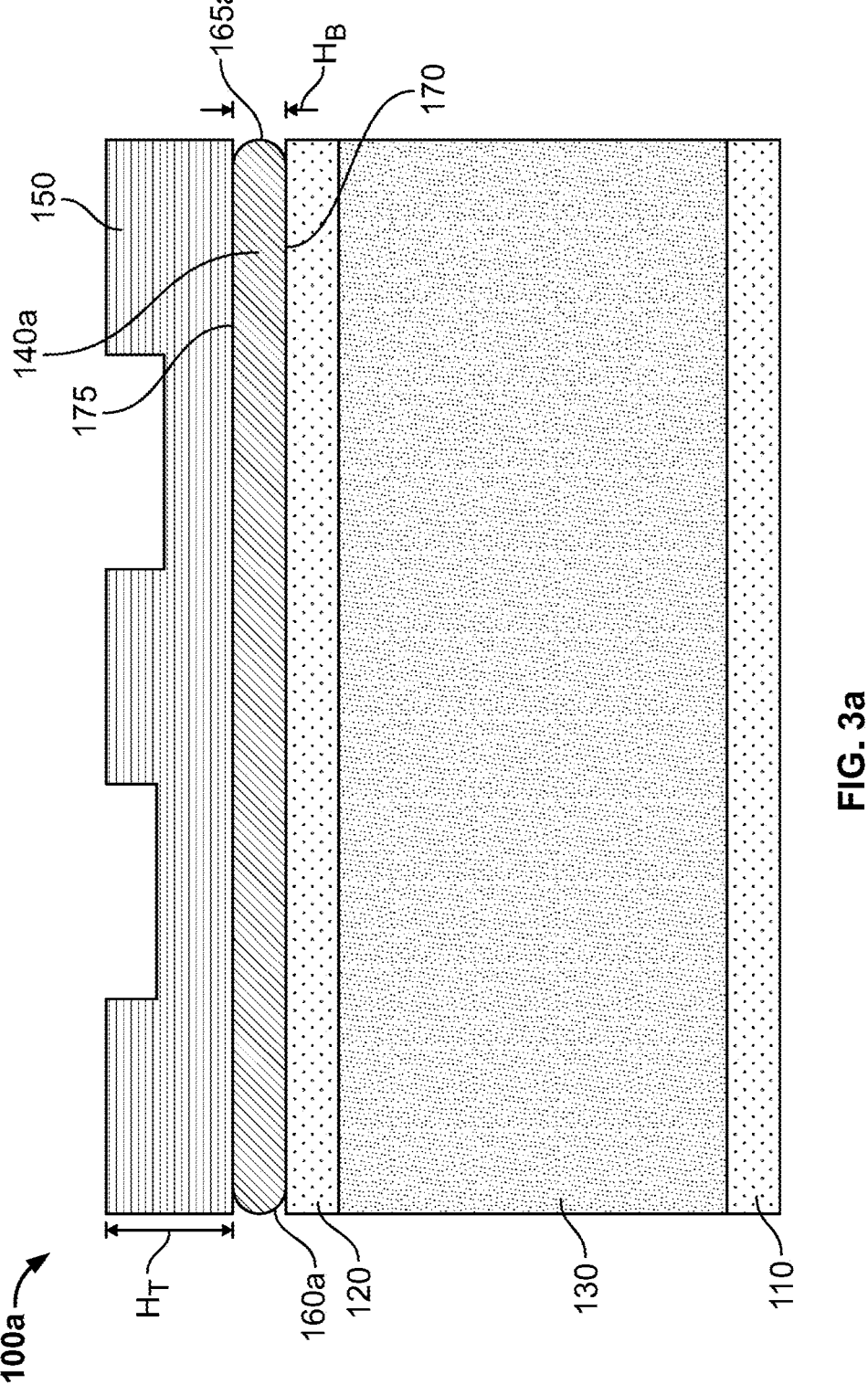
FIG. 3a is a schematic drawing illustrating a partial cross-section of one embodiment of a non-pneumatic tire.

FIG. 3a is a schematic drawing illustrating a partial cross-section of one embodiment of a non-pneumatic tire 100a. In this embodiment, the non-pneumatic tire 100a includes a tire structure having an inner ring 110, an outer ring 120, and a support structure 130 extending from the inner ring to the outer ring. In one embodiment, the support structure 130 is a webbing, such as the webbing shown in FIGS. 1 and 2. In an alternative embodiment, the support structure includes a plurality of spokes. It should be understood, however, that any support structure may be employed.

The non-pneumatic tire 100a includes a circumferential tread having approximately the same width as the outer ring 120. The circumferential tread includes a band layer 140a constructed of a single material. A tread rubber layer 150 is directly attached to the band layer 140a.

The band layer 140a-d includes a first face 170 and a second face 175, as can be best seen in FIGS. 3a-3d. In the illustrated embodiments, each of the first face 170 and the second face 175 extend linearly in the axial direction and extends substantially parallel with the axial direction of the non-pneumatic tire 100a-d. In an alternative embodiment, the first face or the second face may extend in a non-linear fashion in the axial direction. In another alternative embodiment, the first face or the second face may be angled or curved relative to the axial direction of the non-pneumatic tire.

The first and second edges 160a-d, 165a-d space the first face 170 from the second face 175. The first edge and the second edge 160a-d, 165a-d of the band layer 140a-d have a geometry that gives the band layer 140a-d a nonrectangular cross section. In each of these embodiments, the edges may be described as tapered. FIG. 3a illustrates one example in which the edges are rounded. In other words, the geometry of each of the first edge and the second edge 160a, 165a is a continuously curved surface having a semi-circle cross section. The radius of curvature of the continuously curved surface may be one half the thickness of the band layer 140a. However, the radius of curvature of the continuously curved surface may be any desired value.

Band layers having a rectangular cross section with orthogonal axial edges may be sensitive to surface imperfections (e.g., scratches, gouges, nicks) that could grow into a crack that may result in failure of the band layer. The continuously curved surface geometry of the first and second edges 160a, 165a of the band layer 140a shown in FIG. 3a eliminates the orthogonal axial edges and provides the band layer 140a with a nonrectangular cross section. This arrangement may reduce the sensitivity of the band layer 140a to such minor imperfections and enhance fatigue life of the band layer 140a, thereby increasing the robustness of the band layer 140a over known band layer designs.

Figure 3B:
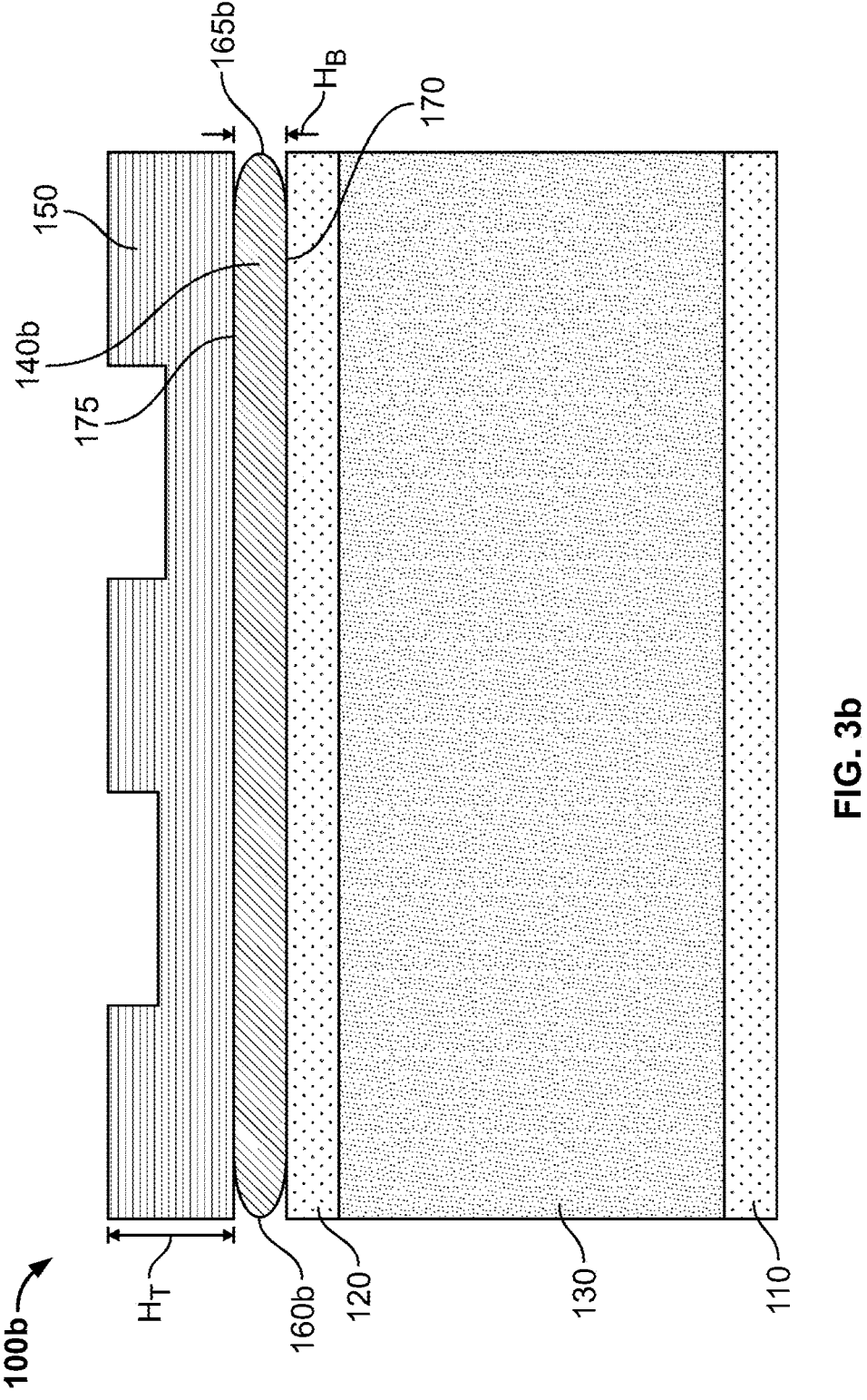
FIG. 3b is a schematic drawing illustrating a partial cross-section of an alternative embodiment of a non-pneumatic tire.
Figure 3C:
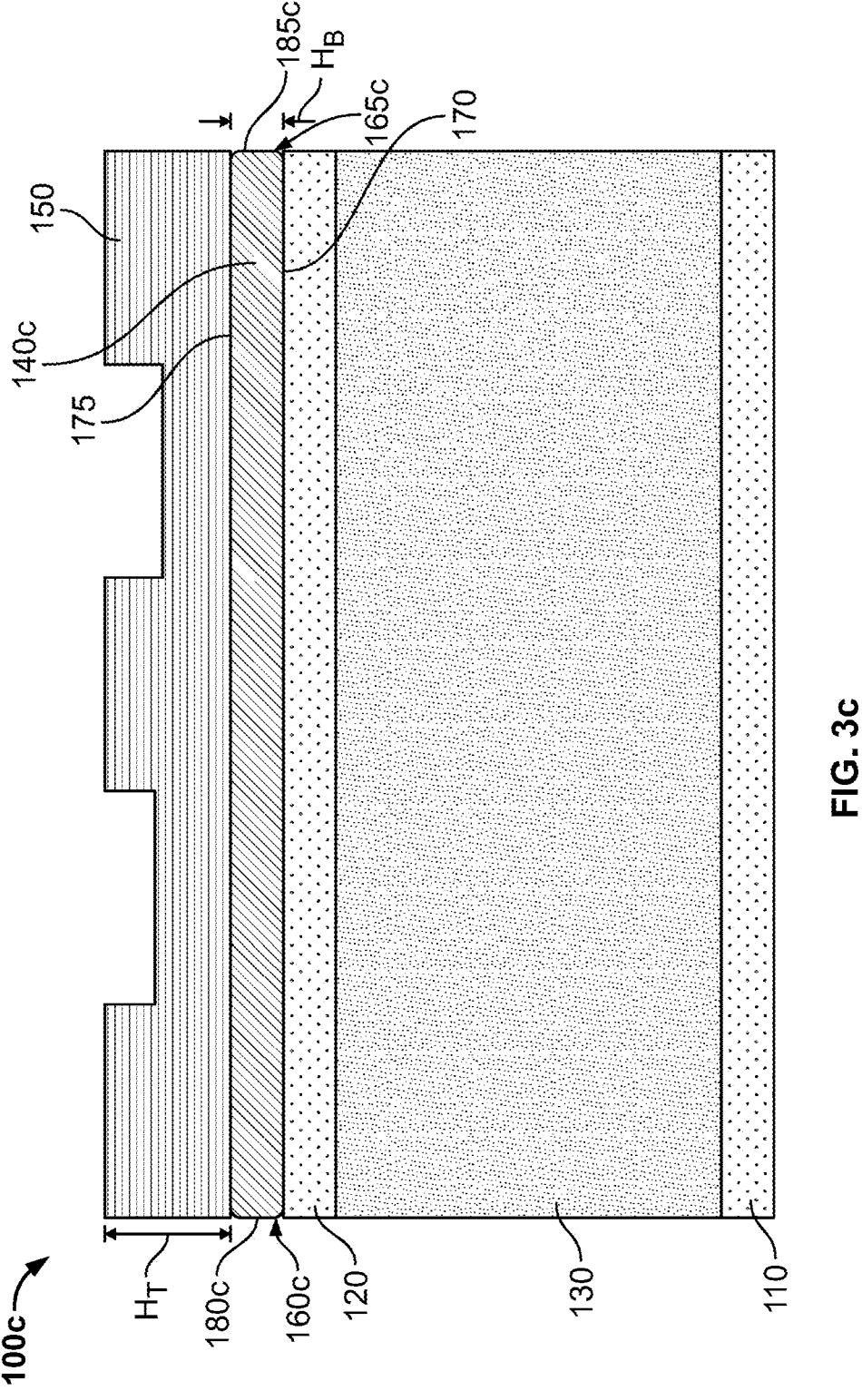
FIG. 3c is a schematic drawing illustrating a partial cross-section of another alternative embodiment of a non-pneumatic tire.
Figure 3D:
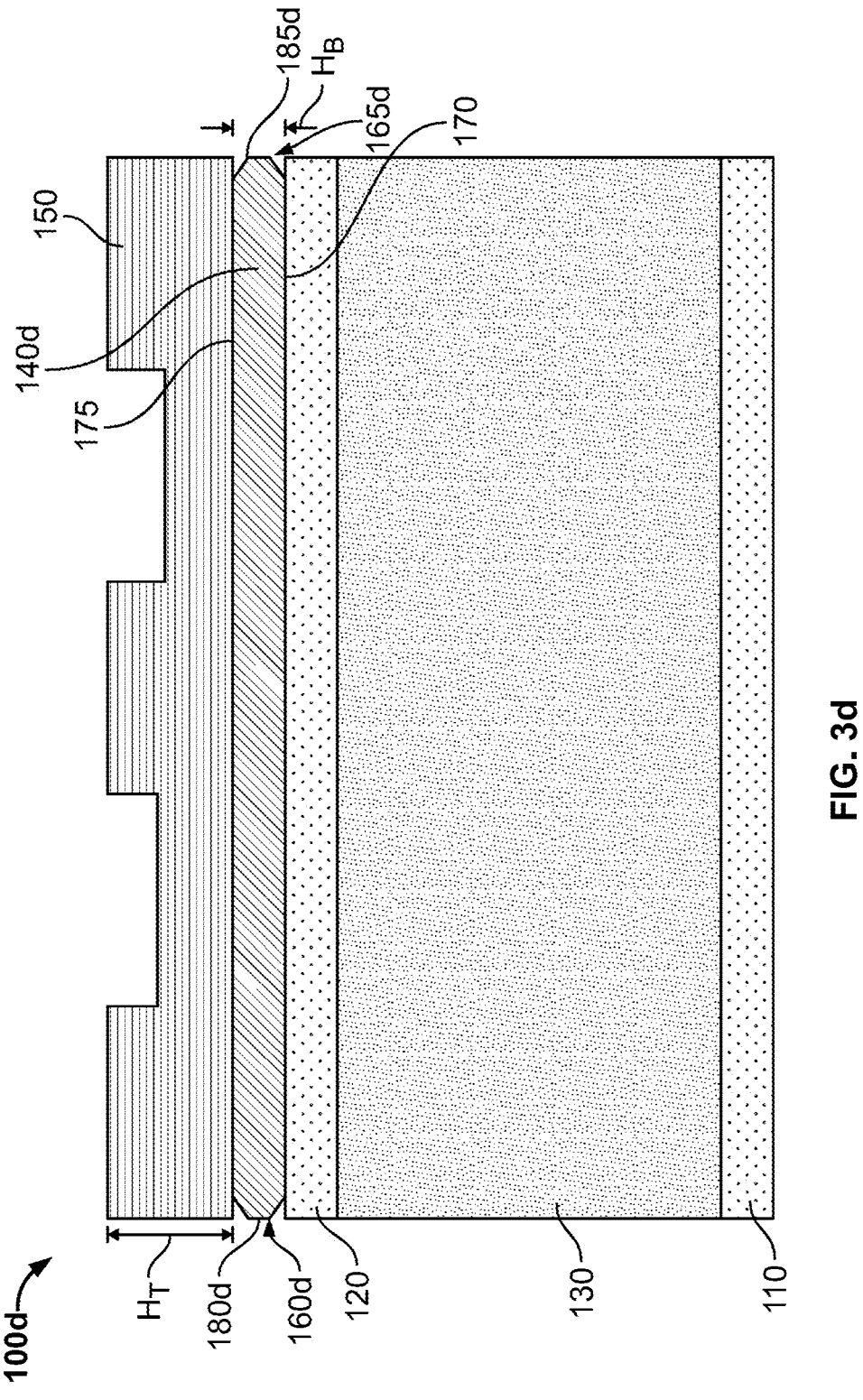
FIG. 3d is a schematic drawing illustrating a partial cross-section of yet another alternative embodiment of a non-pneumatic tire.

FIGS. 3b-3d illustrate alternative edge geometries that may be employed. It should be understood that these embodiments are merely exemplary, and additional geometries may be employed that provide greater complexity than a rectangular cross-section. In the embodiment shown in FIG. 3b, the geometry of the first edge and the second edge 160b, 165b is a continuously curved surface having a semi-elliptical cross section. In another alternative embodiment, the geometry of the first or second edges may be a continuously curved surface defined by a plurality of radii. In yet another alternative embodiment, the first or second edges may be a continuously curved surface having any desired cross section. In yet another alternative embodiment, the geometry of only one of the first and second edges may be provided as a continuously curved surface.

As shown in FIGS. 3c and 3d, rather than a continuously curved surface, the geometry of the first and second edges 160c-d, 165c-d may include a respective straight portion 180c-d, 185c-d. In this case, as shown in FIG. 3c, the geometry of the first edge and the second edge 160c, 165c includes a curved surface between the straight portions 180c-d, 185c-d and the faces 170,175. In other words, the first and second edges 160c, 165c have rounded corners. In another example, as shown in FIG. 3d, the geometry of the first edge and the second edge 160d, 165d includes a linear surface between the straight portions 180c-d, 185c-d and the faces 170,175. In other words, the first and second edges 160d, 165d have chamfered corners.

In each of the foregoing examples, the geometry of the first edge and the second edge 160a-d, 165 a-d eliminates the orthogonal axial edge of known band layer designs. Regardless of the specific geometry employed, providing a band layer that is free from orthogonal axial edges enhances fatigue life and reduces sensitivity of the band layer to surface imperfections, thus improving band layer robustness.

The geometry of the first edge or the second edge 160a-d, 165a-d may be any desired combination of anyone one of the foregoing described geometries, including the described continuously curved surface. The geometries of the first and second edges 160a-d, 165a-d may be formed using any desired manufacturing process. Non-limiting examples of manufacturing processes that may be used to form the geometries of the first and second edges 160a-d, 165a-d include machining, rolling, shot peening, grinding, molding, hydroforming, flow forming or roll forming.

According to one example, the geometry of the first edge 160a-d or the second edge 165a-d may be provided by initially forming the edge using laser cutting, skiving, or any other desired cutting process. Then, the cut edges may be subsequently treated with a rolling process, shot peening process, burnishing process or any combination thereof to provide a rounded edge with a desired smoothness. In alternative embodiments, the first edge or the second edge may be treated with a rolling process, shot peening process, burnishing process or any combination thereof without prior edge forming.

To further improve the robustness of the band layer 140a-d, the faces 170, 175 or the edges 160a-d, 165a-d of the band layer 140a-d may be provided with a specific surface roughness. In one example, the average surface roughness of the band layer 140a-d is less than 25 microns, preferably less than 1.6 microns, and ideally less than 0.8 microns. These specific roughness values are considered when measuring the surface roughness of the band layer 140a-d along the circumferential direction of the non-pneumatic tire 100a-d and also along axial direction of the non-pneumatic tire 100a-d. In another embodiment, the specific roughness values are considered when measuring the surface roughness of the band layer 140a-d along the circumferential direction of the non-pneumatic tire 100a-d, but not the axial direction of the non-pneumatic tire 100a-d. For example, in one such embodiment, the surface may be relatively smooth in the circumferential direction, and relatively rough in the axial direction. Smoothing the surface in a single direction may be less time consuming and less costly. In yet another embodiment, the specific roughness values are considered when measuring the surface roughness of the band layer 140a-d along the axial direction of the non-pneumatic tire 100a-d, but not the circumferential direction of the non-pneumatic tire 100a-d.

The specific surface roughness may be imparted to the band layer 140a-d using any desired manufacturing process. Examples of manufacturing processes that may be used to impart the specific surface roughness include, but are not limited to shot peening, laser shock peening, low plasticity burnishing, machining, grinding, polishing, or lapping. Alternatively, the surface rough may be provided by an isotropic etching process, or by a chemical treatment. Using any of the foregoing processes to provide the band layer 140a-d with a surface roughness of less than 25 microns eliminates, or at least substantially reduces, surface imperfections on the band layer that may propagate through the band layer and result in band failure. The specified surface roughness of less than 25 microns enhances fatigue life of the band layer 140a-d. Accordingly, providing a surface roughness of less than 25 microns may improve robustness of the band layer 140a-d. Providing a roughness of less than 1.6 microns, or less than 0.8 microns in the circumferential direction, axial direction, or both may further enhance these benefits.

The single material of the band layer 140a-d may be a composite, or blend of multiple materials, but the band layer 140a-d is not formed of distinct layers of materials. In one embodiment, the band layer 140a-d is constructed of steel. In one specific embodiment, the band layer 140a-d is constructed of ultra high strength steel. Other exemplary materials include, without limitation, rubber, carbon fiber, other metals such as aluminum, brass, copper, and stainless steel, or polymeric materials including polyurethane, polyester, and polyvinyl chloride (PVC).

Favorable performance may be achieved with a band layer constructed of a material having a high ultimate tensile strength and a surface finish with low surface roughness. In one embodiment, the band layer is constructed of a material having an ultimate tensile strength of at least 60,000 pounds of force per square inch (i.e., 60 ksi or 410 MPa). In another embodiment, the band layer is constructed of a material having an ultimate tensile strength of at least 120,000 pounds of force per square inch (i.e., 120 ksi or 830 MPa). In yet another embodiment, the band layer is constructed of a material having an ultimate tensile strength of at least 200,000 pounds of force per square inch (i.e., 200 ksi or 1400 MPa). A band layer constructed of a material having a high ultimate tensile strength has a better fatigue life.

The illustrated structure carries an applied load by resisting bending about its neutral axis. Bending of the band layer 140a-d assists in carrying a load on the non-pneumatic tire 100a-d. If metal or other materials with very low hysteresis are used for the band layer 140a-d, rolling resistance and heat generation of the assembly can be reduced. This is a departure from prior polymeric shear layers having plies of steel cords. Such polymeric shear layers provide load carrying capability, at the expense of high rolling resistance and heat generation.

In the illustrated embodiment, the band layer 140a-d has a band height (i.e., a band thickness) HB, and the tread rubber layer 150 has a tread height (i.e., a tread thickness) HT that is greater than the band height HB. In one known embodiment, the band height is between 0.010 inches and 0.300 inches (0.254 mm to 7.62 mm). However, other arrangements may be employed. In one embodiment (not shown) the tread height HT is equal to the band height HB. In another embodiment (not shown), the tread height HT is less than the band height HB.

The heights of the band layer and the tread layer may be selected to provide desirable performance of the non-pneumatic tire. For example, it may be desirable to balance the bending stiffness of the band layer with the thickness of the band layer to regulate a bending moment about the neutral axis to carry a desired load at a desired deflection.

[Selecting the heights of the band layer and the tread rubber layer also allows the tire designer to select the location of a neutral axis of the circumferential tread. For example, the neutral axis location may be selected such that the circumferential tread would have different bending stiffness in different directions. If the neutral axis is closer to an outer diameter of the tire, the lead and trailing edge of the footprint will be harder to bend, thus increasing load carrying capacity. However, if the tire rolls over an object, it would have a lower bending stiffness in that direction thus allowing for easier envelopment and a more comfortable ride.

In selecting the materials and heights of each layer, other factors may be considered. For example, it may be desirable to reduce the band layer thickness to reduce volume and weight, as well as the amount of heat generated during rotation of the tire. It may also be desirable, however, to increase band layer thickness to reduce stress in the band layer.

Additionally, it may be desirable to select the thickness and stiffness of the tread rubber layer and the band layer to regulate footprint length.

It has been found that a band in the form of a seamless, metal cylinder yields good results. Such cylinders may have a diameter between 20-50 inches (50-130 cm). In more specific embodiments, the cylinder has a diameter between 30-40 inches (75-100 cm). In one specific embodiment, the cylinder has a diameter of 36 inches (91 cm).

As noted above, the cylinder thickness may be between 0.010 inches and 0.300 inches (0.254 mm to 7.62 mm). In more specific embodiments, the cylinder thickness is between 0.020 inches and 0.150 inches (0.50 mm to 3.8 mm). In one specific embodiment, the cylinder thickness is 0.145 inches (3.68 mm).

As noted above, the seamless cylinder may be made of steel. Exemplary steel includes ultra high strength steel, 4340 steel, or 1080 steel. Alternatively, the seamless cylinder may be formed of an alloy.

In one embodiment, the seamless cylinder is made by a rough forging process, which may produce a cylinder with a desired diameter. However, it is difficult to forge a cylinder having a diameter between 20-50 inches and a thickness between 0.010 inches and 0.300 inches. Forging a cylinder with such dimensions may result in cracks, micro-cracks, or other irregularities.

Therefore, in an alternative embodiment, a seamless cylinder with a diameter between 20-50 inches and a thickness between 0.300 inches to 1 inch is made by a rough forging process. The cylinder is then machined or lathed to a desired thickness of between 0.010 inches and 0.300 inches. The machining or lathing may be performed in multiple steps. The cylinder may also be subjected to heat treatment steps and polishing steps. Such a process may be time intensive, and may produce undesirable waste.

In another alternative embodiment, a seamless cylinder with a diameter between 20-50 inches and a thickness between 0.300 inches to 1 inch is made by a rough forging process. The thickness of the cylinder is then reduced by a cold forming process. Exemplary cold forming processes include deep drawing, closed die-forging, metal spinning, and flow forming (including reverse flow forming). In one specific embodiment, a seamless cylinder with a diameter of 36 inches and a thickness of 0.5 inches is formed by a rough forging process and then the thickness is reduced to between 0.010 inches to 0.300 inches by a cold forming process.

The cold forming process both reduces the thickness and increases the length of the cylinder. Thus, in one embodiment, a cylinder is rough forged with a length that is shorter than desired, and the cold forming process elongates the cylinder to a desired length. In another embodiment, the cold forming process elongates the cylinder to a greater than desired length. In such an embodiment, the cold formed cylinder may be cut into two or more cylinders.

The cold forming process also increases the hardness of the cylinder. In one known embodiment, a steel cylinder has a hardness of 45-60 on the Rockwell C scale after a cold forming process. Alternatively, the steel cylinder may have a hardness of less than 45 of the Rockwell C scale after a cold forming process. Likewise, the steel cylinder may have a hardness of greater than 45 of the Rockwell C scale after a cold forming process.

A seamless cylinder may be formed by a rough forging and cold forming process without performing a heat treatment. In other embodiments, however, a heat treatment may still be performed. In one specific embodiment, a specialized heat treatment process known as vacuum inert gas quench hardening is employed. This process achieves the same properties as a standard furnace heat treatment followed by an oil, water, or ethylene glycol quench but has the distinct benefit of preventing oxidation to the steel during the process. Steps of stress relieving, hardening, and tempering may be performed fully under vacuum to prevent oxidation to the steel. Because there is little to no oxidation during such a heat treatment process, additional processing such as grinding or polishing may be omitted.

The cold forming process also smooths the outer surface of the cylinder. Thus, a seamless cylinder may be formed by a rough forging and cold forming process without polishing the cylinder. In other embodiments, a polishing step may still be performed.

Figures 4A, 4B:
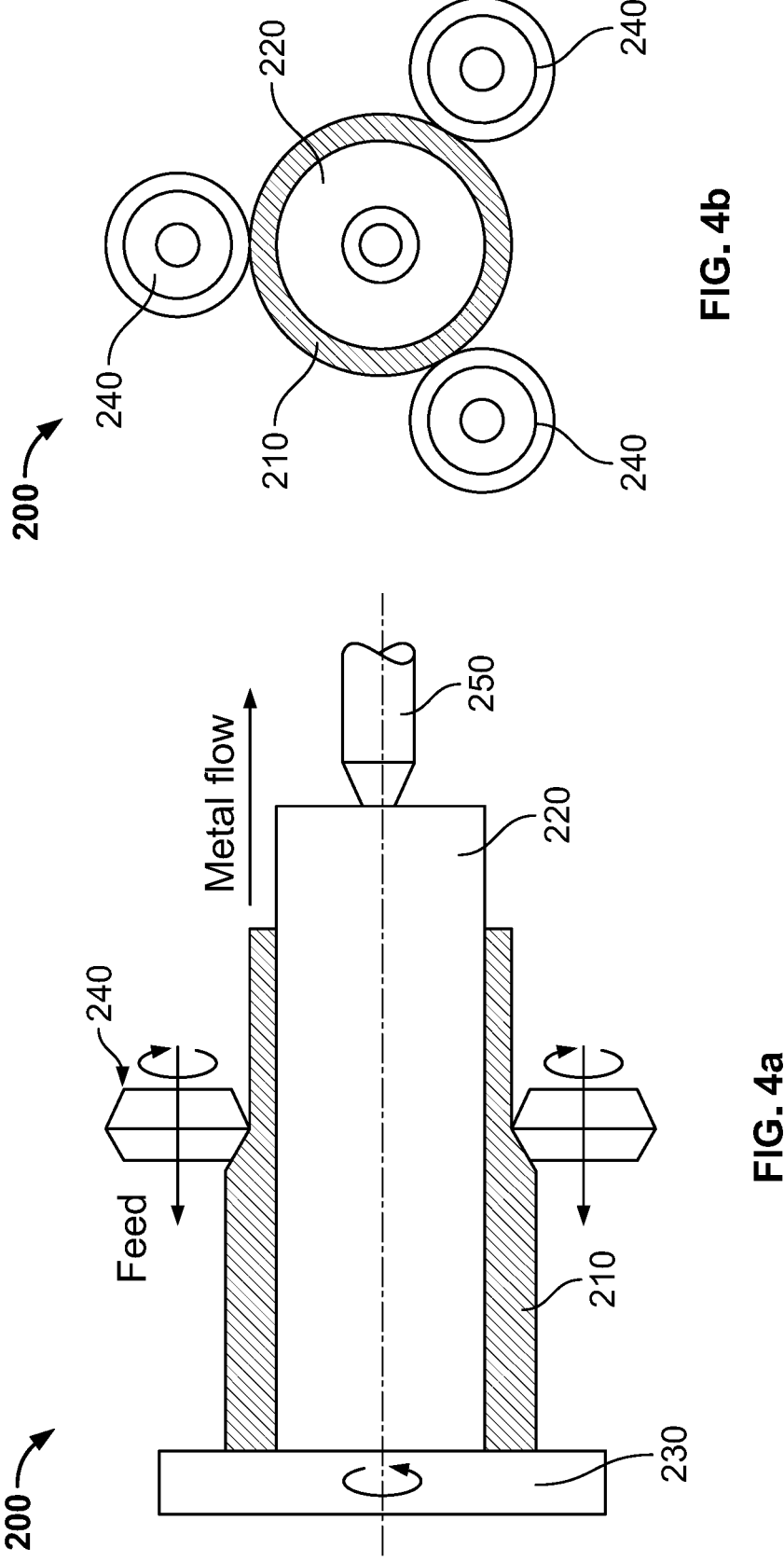

In one embodiment, the cold forming process is a reverse flow forming process, as illustrated in FIGS. 4a, b. FIG. 4a illustrates a cross-sectional view of a reverse flow forming system 200, while FIG. 4b illustrates a front view of the reverse flow forming system 200. In this system, a seamless cylinder 210 is placed on a mandrel 220 having a spindle 230. The seamless cylinder 210 is open ended and may be referred to as a preform. The seamless cylinder 210 may be constructed of one of the materials identified above and may be formed by a rough forging process.

After the seamless cylinder 210 is placed on the mandrel 220, the spindle 230 rotates the mandrel 220 and the seamless cylinder 210 in a first direction. A plurality of rollers 240 engage the seamless cylinder 210 and the rollers 240 rotate in a second direction opposite the first direction. A tailstock 250 provides support for the system.

The rollers 240 then move towards the spindle, reducing the thickness of the seamless cylinder 210, and causing the material of the cylinder to move in a direction opposite to the travel direction of the rollers 240. In the illustrated embodiment, three cylinders are employed. In alternative embodiments, any number of rollers may be employed.

In one embodiment, the rollers 240 are spaced from the mandrel 220 by a distance equal to the desired thickness of the finished cylinder. Thus, in such an embodiment, the thickness of the cylinder 210 is reduced to the desired thickness by a single pass of the rollers 240. In an alternative embodiment, the rollers 240 are first spaced by a distance greater than the desired thickness of the finished cylinder. In such an embodiment, after a first pass of the rollers 240, the rollers 240 are returned to an axial starting position and the distance between the rollers 240 and the mandrel 220 is reduced. A second pass of the rollers is then performed. If the thickness of the cylinder is still greater than desired, the process can be repeated for as many passes as desired.

In all embodiments, the rollers 240 may be staggered both axially and radially.

Figures 5A, 5B:
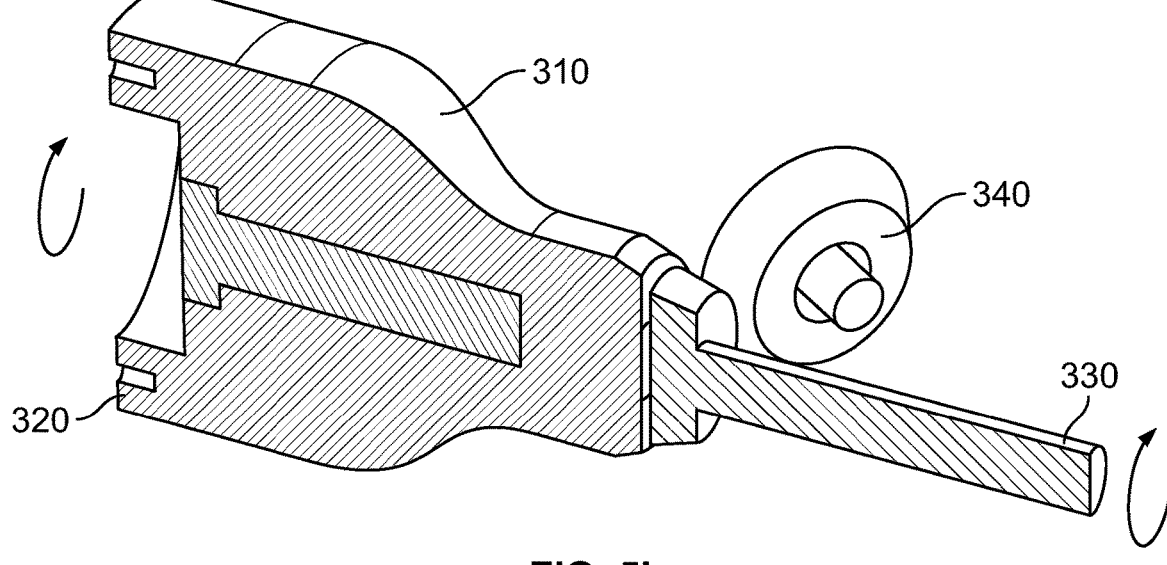
FIG. 5a is a perspective view of one embodiment of a metal spinning system showing a metal plate in various stages of deformation.
FIG. 5b is a perspective view of the metal spinning system of FIG. 5a showing the metal plate in a final form.

In an alternative embodiment, the seamless cylinder is formed by a metal spinning process. FIG. 5a illustrates a perspective view of a metal spinning system 300 showing a metal plate 310 in various stages of deformation. FIG. 5b illustrates a perspective view of the metal spinning system 300 showing the metal plate in a final form.

In the illustrated embodiment, the plate 310 is placed against a mandrel 320 and held in place by a tail stock 330. The mandrel 320 and tail stock 330 then rotate in a first direction, causing the plate 310 to rotate in the same direction. A roller 340 then engages the plate 310 and rotates in a second direction opposite the first direction. The roller 340 than moves away from the tail stock 330 causing the plate 310 to deform as shown in FIG. 5a and take the shape of the mandrel 520.

After the roller 340 completes its pass, the deformed plate 310 has a closed shape having a cylindrical end. The cylindrical end of the deformed plate 310 can then be cut or otherwise separated.

In one embodiment, the circumferential tread is pre-formed by first assembling the band layer and the tread rubber layer. The circumferential tread is then attached to the outer ring 120 with an adhesive, by welding or brazing, or by a chemical bond, such as by heating the components to create a bond.

In an alternative embodiment, the circumferential tread may be built layer by layer onto the outer ring 120. The building process would include placing the band layer about the outer ring 120, and then placing the tread rubber layer about the band layer. In one embodiment, the layers are attached to each other at each step, such as with an adhesive, by welding or brazing, or by a chemical bond, such as by heating the components to create a bond. In an alternative embodiment, the tire is heated after all of the layers are assembled, such that the layers bond to each other.

In an alternative embodiment, a seamed, metal or high strength polymer cylinder may be formed from a sheet of metal or high strength polymer. In one known embodiment, the sheet of metal or high strength polymer has a thickness between 0.010 inches and 0.300 inches. In comparison to a forged, metal cylinder, a sheet of such thickness is less likely to result in cracks, micro-cracks, or other irregularities. Thus, manufacturing a seamed, metal or high strength polymer cylinder from a thin sheet of metal or high strength polymer may be advantageous, because less processing is required after such a cylinder is formed, and the resulting cylinder may be comparable to, or even have fewer stress concentrations than a seamless, metal cylinder. It should be understood, however, that the sheet may have a greater thickness that is reduced during a manufacturing process. For example, the sheet may have an initial thickness between 0.300 inches to 2 inches that is reduced.

In one embodiment, a seamed, metal cylinder is formed from a flat plate stock of steel. In another embodiment, a seamed, metal cylinder is formed from a flat plate stock of other metal, such as aluminum, tin, brass, nickel, copper, titanium, or other metal or alloy, particularly a high strength alloy. In yet another embodiment, a seamed cylinder may be formed from a high strength polymer.

In one embodiment a flat plate stock or sheet of metal or high strength polymer has a rectangular shape. In one embodiment, the sheet is formed as a single plate to specified dimensions. In an alternative embodiment, the sheet is formed as an elongated sheet that is cut down to specified dimensions. The sheet is then rolled in a longitudinal direction such that a first end or edge contacts a second end or edge to form a cylinder.

In one embodiment, the first end and the second end of the rectangular sheet form a longitudinal seam. The longitudinal seam may then be welded. In one embodiment, the welded seam is fashioned with techniques that produce a joint that is of the same composition as the matrix such as friction stir welding, laser welding, electron beam welding, or induction welding techniques. The chosen process may eliminate the need for a filler material and maintain the high strength and toughness of the material of the sheet.

In an alternative embodiment, a flat plate stock or sheet of metal or high strength polymer has a parallelogram shape. In one embodiment, the sheet is formed as a single plate to specified dimensions. In an alternative embodiment, the sheet is formed as an elongated sheet that is cut down to specified dimensions. The sheet is then rolled such that a first end or edge contacts a second end or edge to form a cylinder.

The first end and the second end of the parallelogram-shaped sheet form a diagonal seam. The diagonal seam may then be welded, using one of the welding processes discussed above for a longitudinal seam.

In another alternative embodiment, a flat plate stock or sheet of metal or high strength polymer has an elongated parallelogram shape. In one embodiment, the sheet is formed as a single plate to specified dimensions. In an alternative embodiment, the sheet is formed as an elongated sheet that is cut down to specified dimensions. The sheet is then spiraled such that a first side or edge contacts a second side or edge in a spiral formation along a resulting cylinder.

The first side and the second side of the elongated parallelogram form a spiral seam of the cylinder. The spiral seam may then be welded, using one of the welding processes discussed above for a longitudinal seam.

The examples are not intended to be limiting. It should be understood that other seams may be employed. For example, the seams may be non-linear, such as a curve or wave-shaped seam.

In one embodiment, no post-production processing is performed after the seam is welded. In other words, no machining, resizing, or heat-treatment is performed. In an alternative embodiment, after the welding step, a stress relieving operation may be performed to alleviate any stresses after formation of the cylinder. For example, a cold forming process may be performed. In one embodiment, the cold forming process is a reverse flow forming process, such as the process described above with reference to FIGS. 4a, b.

In one embodiment, the rollers are spaced such that the thickness of the welded seam is reduced to the same thickness of the rest of the cylinder, while the wall thickness of the cylinder is not otherwise changed. In another embodiment, the rollers are spaced such that the movement of the spindle reduces both the thickness of the welded seam and the wall thickness of the cylinder. In this embodiment, the movement of the rollers further causes the material of the cylinder to move in a direction opposite to the travel direction of the rollers.

In addition to reducing the thickness of the welded seam, the cold forming process may also improve surface finish and strengthen the material. After the cold forming process, the cylinder may also be subjected to heat treatment steps and polishing steps.

When the cylinder has a diagonal weld or a spiral weld, the rotation direction of the rollers can vary with respect to the direction of the weld. In one embodiment, the rollers travel in a complimentary direction of the weld. Alternatively, the rollers may travel in a direction counter to the weld. The final dimensions of the cylinder may be the same as the dimensions described above.

The mechanical properties and fatigue properties of the cylinder may be substantially different after the flow forming process due to the resulting microstructure. It is known that microstructure within in the material is tied directly to the mechanical and fatigue properties. By plastically deforming the material through cold working during the flow forming process, the development of an improved microstructure is projected to not only alleviate stresses at the weld line but result in improvement of mechanical and fatigue properties within the final part.

After a seamed cylinder is formed, the edge is finished in the same manner described above, such that at least one of the first edge and the second edge has a geometry that provides the band layer with a nonrectangular cross section. For example, at least one of the first edge and the second edge may have one of the geometries shown in FIGS. 3a-3d and described above. The nonrectangular cross section may be formed using any of the described methods above.

Additionally, the first and second edges may be finished such that they have the same roughness as described above. The roughness may be imparted on the first or second edge through one of the processes described above.

While the band layer and tread rubber layer have been described with respect to non-pneumatic tires, it should be understood that they may also be employed in pneumatic tires, such as run-flat pneumatic tires.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire defining axial, radial, and circumferential directions, the non-pneumatic tire comprising:

an inner ring having an axis of rotation;

an outer ring coaxial with the inner ring;

a support structure extending from the inner ring to the outer ring;

a circumferential tread extending about the outer ring, the circumferential tread including an annular band layer constructed of a single metal material, wherein the band layer includes:

a first face and a second face opposite the first face, and a first axial edge and a second axial edge, the first and second axial edges spacing the first face from the second face, wherein at least one of the first edge and the second edge is a continuously curved surface that spans between the first face and the second face, and wherein the continuously curved surface has a semi-circle cross section, with the semi-circle defined by a radius that is one-half a thickness of the annular band layer.

2. The non-pneumatic tire of claim 1, wherein the single metal material has an ultimate tensile strength of at least 410 MPa.

* * * * *